(12) United States Patent
Walker et al.

(10) Patent No.: US 9,347,576 B2
(45) Date of Patent: May 24, 2016

(54) PRESSURE RELIEF DEVICE HAVING LASER-DEFINED LINE OF OPENING

(71) Applicant: Fike Corporation, Blue Springs, MO (US)

(72) Inventors: Joe Walker, Kansas City, MO (US); Bon Shaw, Blue Springs, MO (US); Michael Krebill, Lee's Summit, MO (US)

(73) Assignee: Fike Corporation, Blue Springs, MO (US)

( * ) Notice: Subject to any disclaimer, the term of this patent is extended or adjusted under 35 U.S.C. 154(b) by 113 days.

(21) Appl. No.: 14/066,935

(22) Filed: Oct. 30, 2013

(65) Prior Publication Data

US 2014/0116531 A1    May 1, 2014

Related U.S. Application Data

(60) Provisional application No. 61/720,800, filed on Oct. 31, 2012.

(51) Int. Cl.
*F16K 17/16* (2006.01)
*B23K 26/00* (2014.01)

(52) U.S. Cl.
CPC .......... *F16K 17/1606* (2013.01); *B23K 26/0087* (2013.01); *B23K 26/364* (2015.10); *F16K 17/16* (2013.01); *Y10T 137/0491* (2015.04); *Y10T 137/1744* (2015.04)

(58) Field of Classification Search
CPC ....... F16K 17/14; F16K 17/16; B23K 26/364; B23K 26/0087; Y10T 137/1744

USPC .......... 137/68.11, 68.13, 68.19, 68.21, 68.23, 137/68.25, 68.27, 68.28, 68.3; 220/89.2
See application file for complete search history.

(56) References Cited

U.S. PATENT DOCUMENTS

| | | | |
|---|---|---|---|
| 5,058,413 A | 10/1991 | Muddiman | |
| 5,080,124 A | 1/1992 | McGregor et al. | |
| 5,368,180 A * | 11/1994 | Farwell et al. | 220/89.2 |
| 6,672,389 B1 | 1/2004 | Hinrichs | |
| 6,945,420 B2 | 9/2005 | Krebill et al. | |
| 7,600,527 B2 | 10/2009 | Shaw et al. | |
| 8,333,212 B2 * | 12/2012 | Shaw et al. | 137/15.18 |
| 2009/0302035 A1 | 12/2009 | Shaw et al. | |
| 2010/0006547 A1 | 1/2010 | Shaw et al. | |
| 2010/0140238 A1 | 6/2010 | Mozley et al. | |
| 2010/0140264 A1 | 6/2010 | Hernandez | |
| 2010/0224603 A1 | 9/2010 | Modena et al. | |
| 2010/0258200 A1 | 10/2010 | Walker et al. | |
| 2014/0021203 A1 * | 1/2014 | Walker et al. | 220/89.2 |

OTHER PUBLICATIONS

International Search Report and Written Opinion dated Feb. 22, 2014 n the corresponding PCT/US2013/067392 filed Oct. 30, 2013.

* cited by examiner

*Primary Examiner* — Kevin Lee
*Assistant Examiner* — P. Macade Nichols
(74) *Attorney, Agent, or Firm* — Hovey Williams LLP

(57) ABSTRACT

A pressure relief device and method of making the same are provided. The pressure relief device includes an over-pressure relief area with a plurality of co-linear spaced apart recesses located thereon. Gap segments are interspersed between the recesses to define a line of opening having desired performance characteristics during opening of the over-pressure relief area.

25 Claims, 15 Drawing Sheets

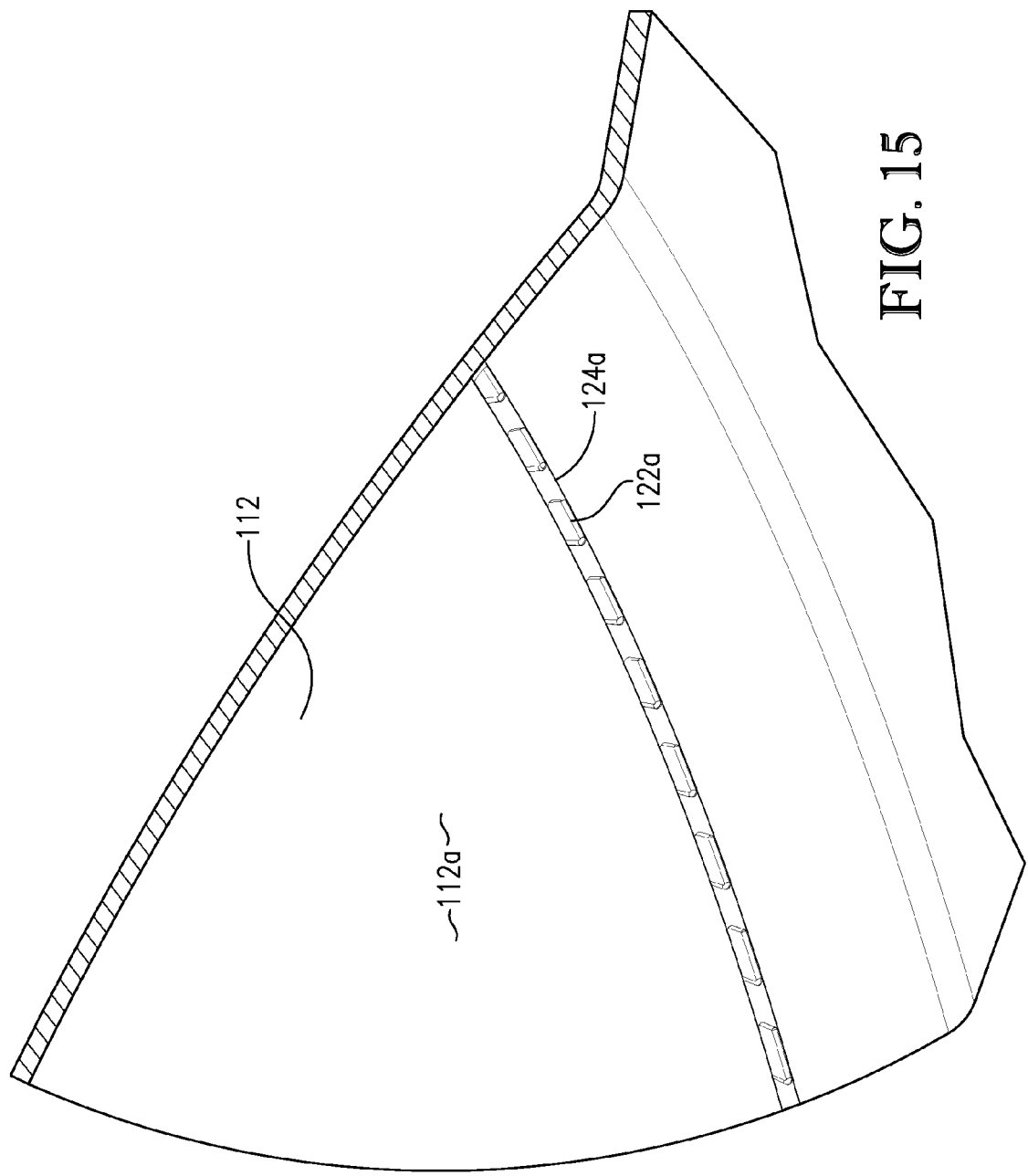

PRESSURE RELIEF DEVICE HAVING LASER-DEFINED LINE OF OPENING

RELATED APPLICATION

The present application claims the benefit of U.S. Provisional Patent Application No. 61/720,800, filed Oct. 31, 2012, which is incorporated by reference herein in its entirety

BACKGROUND OF THE INVENTION

1. Field of the Invention

The present invention is generally directed toward pressure relief devices. In particular, the present invention relates to pressure relief devices that include a line of opening formed by selective operation of a laser to create a plurality of co-linear recesses interspersed with a plurality of gap segments.

2. Description of the Prior Art

Score lines have been for some time in rupture discs to define an area of the disc that opens upon exposure to a predetermined overpressure condition. During opening, the rupture disc tears at the score line to create one or more petals that pivot about one or more respective hinge regions under the force of the overpressure condition to permit a pressurized fluid to flow through the opened disc.

Score lines are typically created through the use of metal scoring dies. When using a metal scoring die to form the score line, the die compresses and work hardens the disc metal, thus changing the grain structure of the metal. This work hardening can increase the brittleness of the metal and create stress zones. The brittleness and stress zones limit the service life of the pressure relief device as a result of fatigue cracking and stress corrosion. Additionally, it is difficult to achieve a high degree of control over the depth of the score in disc manufacturing, given that the die itself becomes worn during the scoring process and must be periodically replaced. This lack of control imparts a degree of unpredictability into the disc opening characteristics.

In order to avoid the issues with die scoring, alternate processes have been devised to form lines about which the rupture disc opens. One such process is described in U.S. Pat. No. 7,600,527 discloses forming a line of weakness through an electropolishing method. In this process, a rupture disc is provided with a layer of resist material. A laser is then used to remove a portion of the resist material corresponding to the desired line of weakness. Next, the disc undergoes an electropolishing operation to remove metal from the surface of the disc thereby forming a line of weakness having a desired depth. However, controlling the width of the electropolished line of weakness can be difficult, particularly if the disc material is relatively thick and requires extended electropolishing times in order to achieve the desired line depth.

It has also been suggested to directly use a laser to machine a line of weakness into a rupture disc. U.S. Patent Application Publications 2010/0140264 and 2010/0224603 are exemplary in this regard. However, these references adopt conventional line of weakness configurations insofar as the lines of weakness comprise relatively long, continuous recesses formed in one face of the disc which can limit the range of burst pressures than can be created for a disc of a particular thickness.

SUMMARY OF THE INVENTION

In one embodiment of the present invention, there is provided a pressure relief device comprising an over-pressure relief area and a circumscribing flange portion. The over-pressure relief area includes a pair of opposing faces and a line of opening formed in at least one face thereof. The line of opening comprises a plurality of co-linear spaced-apart lased recesses, and defines, at least in part, a relief area petal that is formed upon opening of said relief area.

In yet another embodiment of the present invention, there is provided a method of forming a line of opening in a pressure relief device. A pressure relief device is provided that comprises an over-pressure relief area and a circumscribing flange portion. The over-pressure relief area comprises opposing faces. The line of opening is formed in the over-pressure relief area using a laser to selectively remove material from at least one of said faces and form a plurality of co-linear spaced-apart lased recesses, said line of opening defining, at least in part, a relief area petal that is formed upon opening of said relief area.

BRIEF DESCRIPTION OF THE FIGURES

FIG. 15 is a close up sectioned view of the concave face of the rupture disc of FIG. 13.

DETAILED DESCRIPTION OF THE PREFERRED EMBODIMENT

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
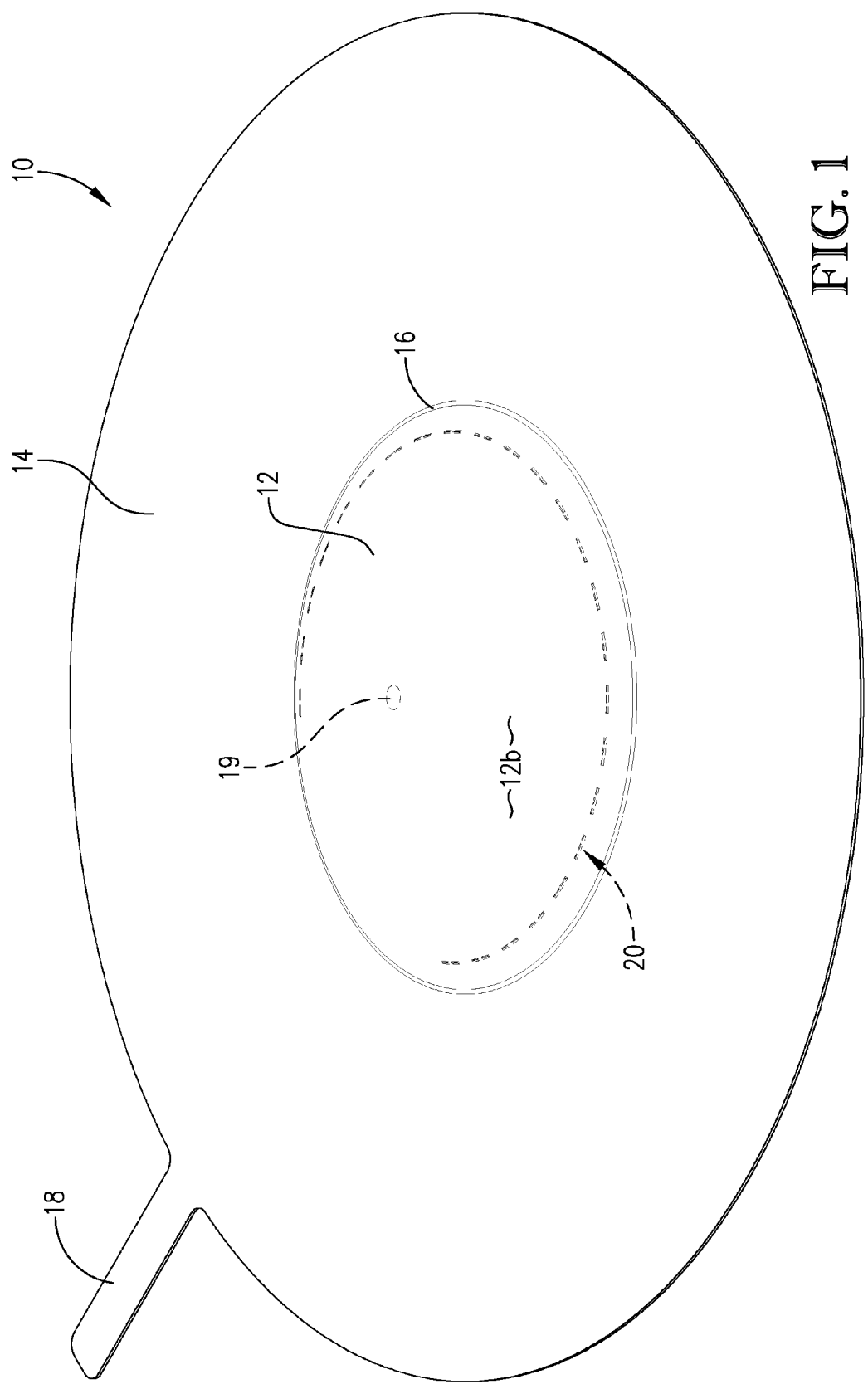
FIG. 1 is a perspective view of a bulged rupture disc having a line of opening made in accordance with the present invention formed in the concave face thereof.

FIG. 1 depicts a reverse acting rupture disc 10. It should be understood that the rupture disc 10, shown in FIG. 1, is just one example of a pressure relief device within which the present invention can be embodied. Other pressure relief devices are also contemplated by the present invention, such as, for example, un-bulged or flat rupture discs, forward acting bulged rupture discs, and various pressure relief vents. The present invention may find application in a wide variety of pressure relief devices where it is desirable to provide increased operational control and predictability.

Rupture disc 10 comprises a central over-pressure relief section 12, also referred to herein as a "bulged section" with reference to the Figures, and an annular flange portion 14 that circumscribes the bulged section 12. A transition zone 16 joins the inner periphery of the flange portion 14 to the outer margin of bulged section 12. The rupture disc 10 of FIG. 1 also includes a peripheral alignment element 18 to assist with proper installation of disc 10.

The components of the rupture disc 10, and other pressure relief devices, can be made from a variety of materials. In certain embodiments, the rupture disc 10, and other pressure relief devices, may comprise a corrosion resistant material. In particular embodiments, rupture disc 10, and other pressure relief devices, can comprise any number of conventional corrosion resistant metals, such as, for example, stainless steel alloys, Hastalloy-C, MONEL, INCONEL, and nickel.

As depicted in FIG. 1, the bulged section 12 may include a reversal initiation feature 19, which is used to control the pressure under which bulged section 12 begins to reverse and subsequently open. In certain embodiments, feature 19 may comprise region of altered metal grain structure having a higher tensile strength than surrounding regions of the bulged section 12. In an embodiment that includes a region of higher tensile strength, such region may be located at the apex or any other portion of the bulged section 12. Such reversal initiation features are described in U.S. Pat. No. 6,945,420, incorporated by reference herein in its entirety. In other embodiments, the reversal initiation feature 19 may comprise a discrete region of bulged section 12 having a lased surface in which disc material has been removed so as to reduce the thickness of the discrete region relative to the immediately adjacent portions of bulged section 12. Such lased reversal initiation features are described in U.S. patent application Ser. No. 13/552,165, incorporated by reference herein in its entirety.

Figure 2:
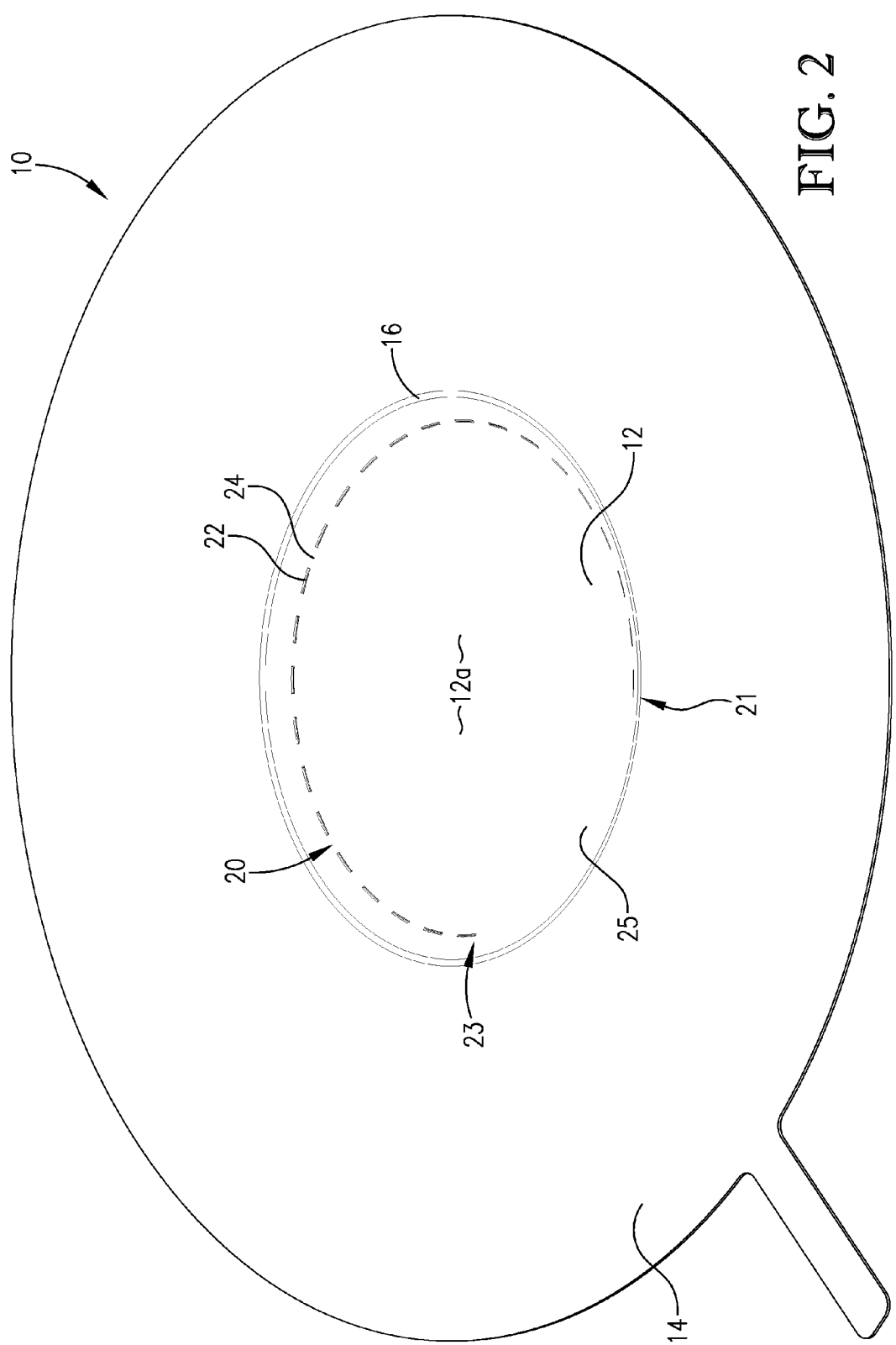
FIG. 2 is a perspective view of the concave face of the rupture disc of FIG. 1, which includes thereon the line of opening comprising a plurality of spaced apart recesses.

The bulged section 12 of rupture disc 10 comprises a concave face 12a and a convex face 12b. As shown in FIG. 2, a line of opening 20 is formed in concave face 12a of the bulged section 12. Although, in this embodiment line of opening 20 extends about the periphery of bulged section 12 in substantially "C-shaped", other patterns forming a line of opening are also contemplated by the present invention. For example, in certain embodiments, the line of opening may extend across the bulged section of the rupture disc and/or intersect with at least one other line of opening to form a cross-shaped pattern.

Figure 3:
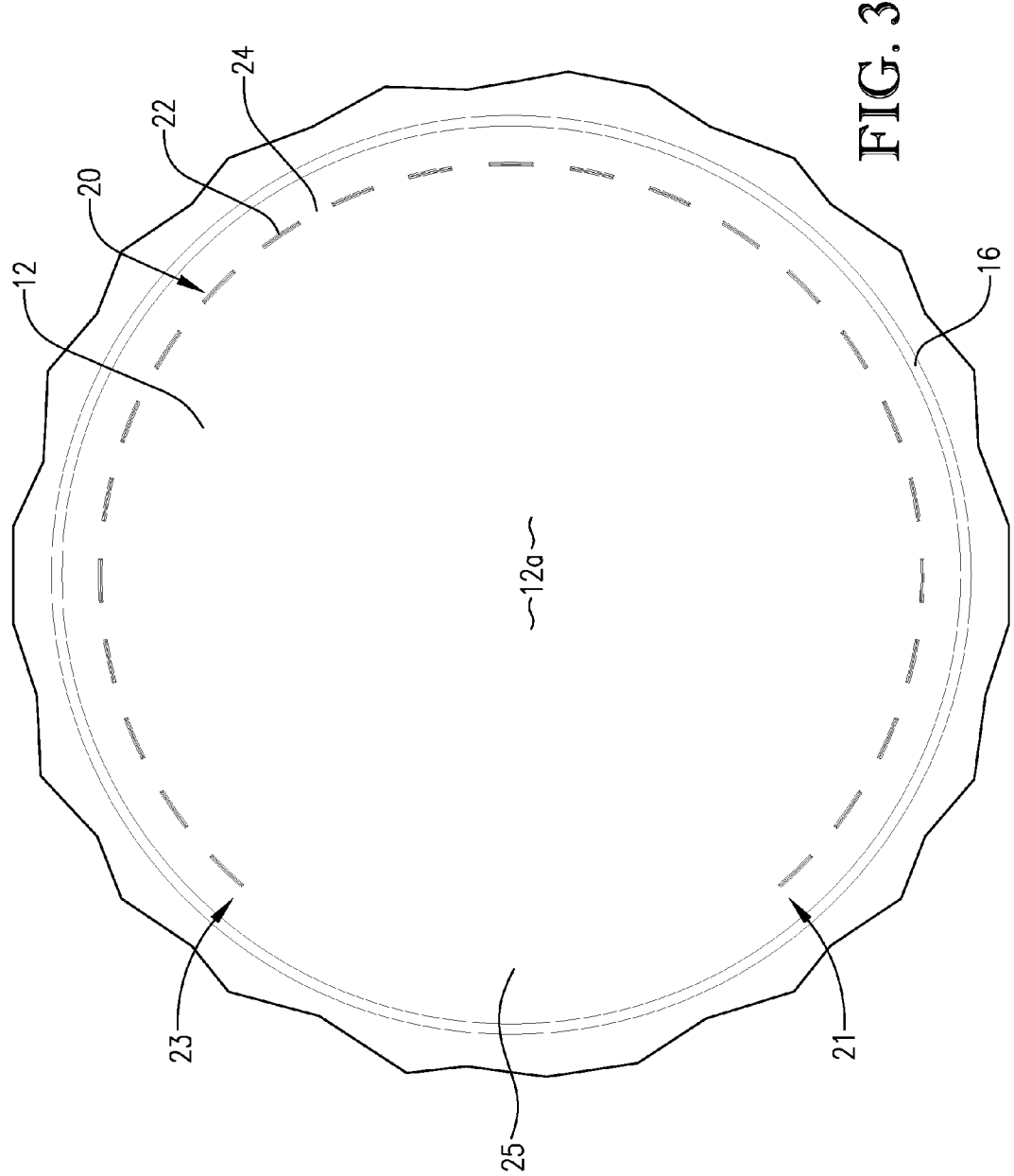
FIG. 3 is a fragmented view of the concave face of the rupture disc of FIG. 1.

Returning to FIGS. 2 and 3, line of opening 20 comprises a pair of spaced-apart opposed end regions 21, 23 that cooperatively define a hinge region 25. Upon opening of disc 10, a petal formed from bulged section 12 as a result of tearing of the disc material along line of opening 20 and pivots about hinge region 25, so that the overpressure condition may be relieved without causing the petal to fragment.

Line of opening 20 comprises a plurality of co-linear recesses 22 and gap segments 24. Gap segments 24 are interspersed with recesses 22, essentially being positioned between adjacent recesses. As used herein, the term "co-linear" can refer to both curvilinear and rectilinear configurations. Recesses 22 generally comprise portions of one of the faces 12a or 12b that have undergone laser machining in which a portion of the disc material has been removed. As shown in the Figures, recesses 22 extend away from face 12a and toward the opposing face 12b, without penetrating opposing face 12b. Thus, recesses 22 are distinguished from slits that extend entirely through the disc material. Gap segments 24 generally have a depth that is less than the depth of recesses 22, and in some embodiments, are substantially flush with the face in which line of opening 20 is formed.

In certain embodiments, the disc material in which recesses 22 are formed is a single-piece, or unlayered, material. For example, bulged section 12 in which line of opening 20 and recesses 22 are formed comprises a single ply or sheet. Irrespective of whether rupture disc 10 comprises additional plies or laminated sheets, recesses 22 are contained only within the single layer, and do not extend all the way therethrough.

In other embodiments, it is possible for disc 10 to comprise a plurality of plies or layers thereby forming a laminate structure. The individual layers may comprise a metallic material, an intermetallic material, a composite material, ceramic, glass, a polymeric material, or combination thereof. In such embodiments, recesses 22 may extend completely through one or more layers, but extend only partially through one of the layers. Thus, like the embodiments described previously, there is at least one layer of the laminate disc structure in which recesses 22 extend only part of the way therethrough. This is contrasted with prior disc structures (see, e.g., U.S. Pat. No. 5,080,124) in which a slit or recess extends completely through one of the disc layers without at least partially extending into one other layer of the disc.

As noted above, recesses 22 can be formed by laser machining Any type of laser that is suitable to remove a portion of the over-pressure relief area material can be used. However, it is preferred that the laser selected not substantially alter the metal grain structure of the relief area material, such as through the creation of heat affected zones. It is within the scope of the present invention, however, for other techniques to be utilized to form recesses 22, such as high speed mechanical milling (see, e.g., U.S. Patent Application Publication No. 2009/0302035 incorporated by reference herein in its entirety) and electropolishing.

Figure 4:
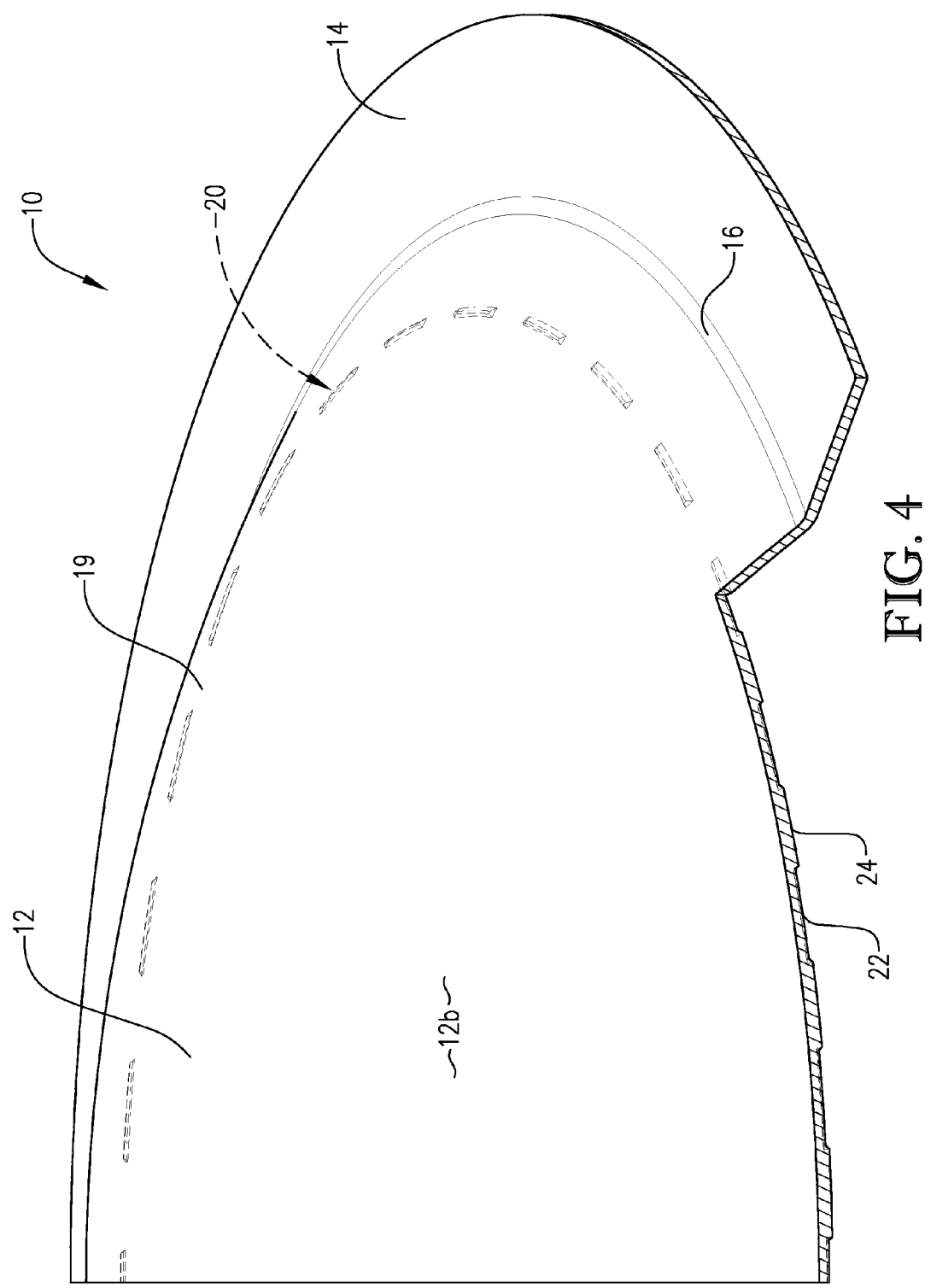
FIG. 4 is close up sectioned view of the convex face of the rupture disc of FIG. 1.
Figure 5:
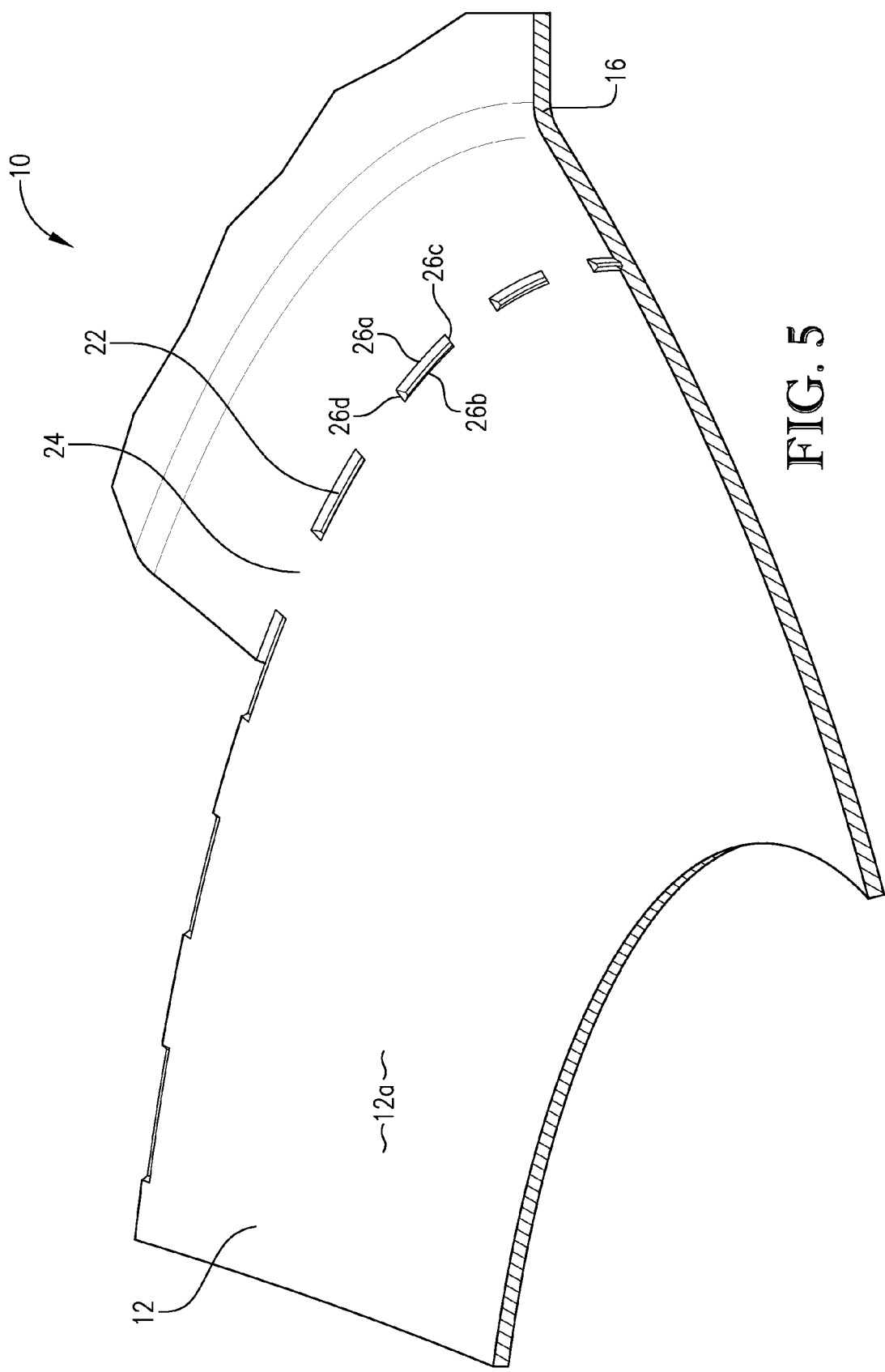
FIG. 5 is a close up sectioned view of the concave face of the rupture disc of FIG. 1.

FIGS. 4 and 5 illustrate in greater detail how recesses 22 extend away from concave face 12a toward convex face 12b, and that gap segments 24 are substantially flush with face 12a. Additionally, recesses 22 present substantially rectilinear margins 26a-d, although such margins may contain some slight curvature particularly when line of opening 20 is of curvilinear configuration.

The lines of opening made in accordance with the present invention provide an increased stiffness and integrity of the over-pressure relief area as compared to traditional score lines and the like. This leads to the ability to more tightly control the tearing qualities of the disc upon opening, and in some embodiments, extending the range of burst pressures for a disc made of a certain material thickness. By varying the relative shape, width, length and depth of the recesses and gap segments, one can optimize the opening characteristics of the disc to suit a particular application. Additionally, because the recesses are formed without altering the metal grain structure of the pressure relief area material adjacent the recesses, metal fatigue concerns are reduced if not eliminated altogether.

The depth of recesses 22 can be varied according to the specifications required for a particular pressure relief device. In certain embodiments, the depth of at least one recess 22 is between about 50% to about 90%, about 60% to about 85%, or about 65% to about 80% of the thickness of the bulged section 12 immediately adjacent thereto. In some embodiments, the depth of recesses 22 may be uniform throughout line of opening 20. In other embodiments, the depth of recesses 22 varies along the length of line of opening 20. For example, a line of opening 20 can comprise recesses 22 proximal to hinge region 25 having a depth that is less than the depth of those recesses opposite from hinge region 25.

In the context of laminate disc structures, the precision of cutting depth afforded by the laser permits the laminate disc structure to be manufactured followed by creation of recesses 22 therein. Previously, manufacture of a multilayered disc structure having one or more recessed areas was performed by first machining through slits in a single-ply disc material. This step was followed by application of a sealing layer over the slitted disc material, or lamination of additional disc plies onto the slitted disc material. However, the present invention permits complete fabrication of the laminate disc structure followed by machining of recesses 22 as described above.

Figure 6:
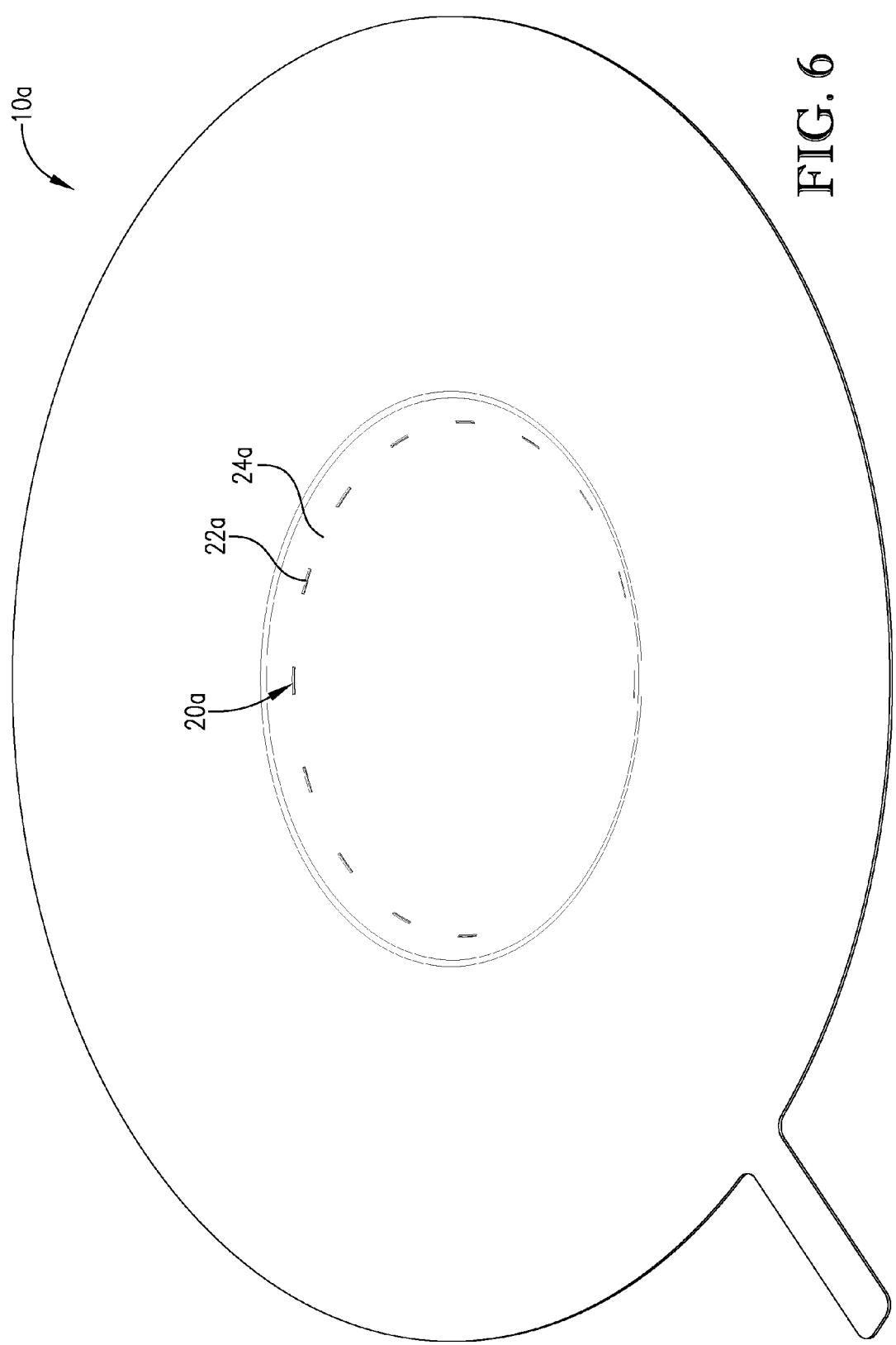
FIG. 6 is a perspective view of the concave face of another rupture disc embodiment depicting a line of opening having relatively long gap segments between adjacent recesses.
Figure 7:
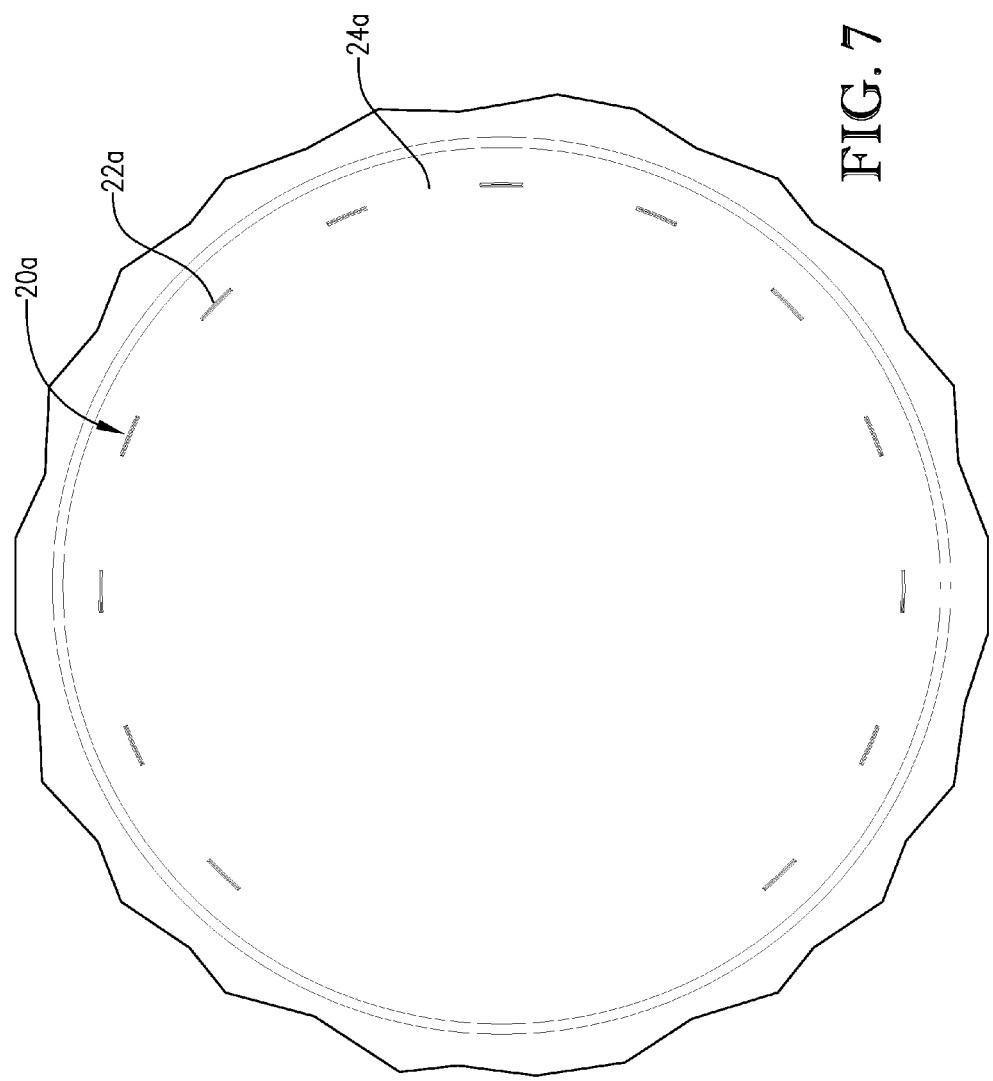
FIG. 7 is a fragmented view of the concave face of the rupture disc of FIG. 6.

With respect to recess length and width, recesses 22 can be substantially uniform or vary significantly throughout the length of line of opening 20. In FIGS. 2-5, recesses 22 and gap segments 24 are regularly spaced throughout the length of line of opening 20. As illustrated, recesses 22 are generally longer than the intervening gap segment 24. However, turning to FIGS. 6-7, a rupture disc 10a is illustrated in which recesses 22a are shorter than the intervening gap segment 24. In certain embodiments, line of opening 20a would have an increased resistance to tearing than line of opening 20 from FIGS. 2-5.

Figure 8:
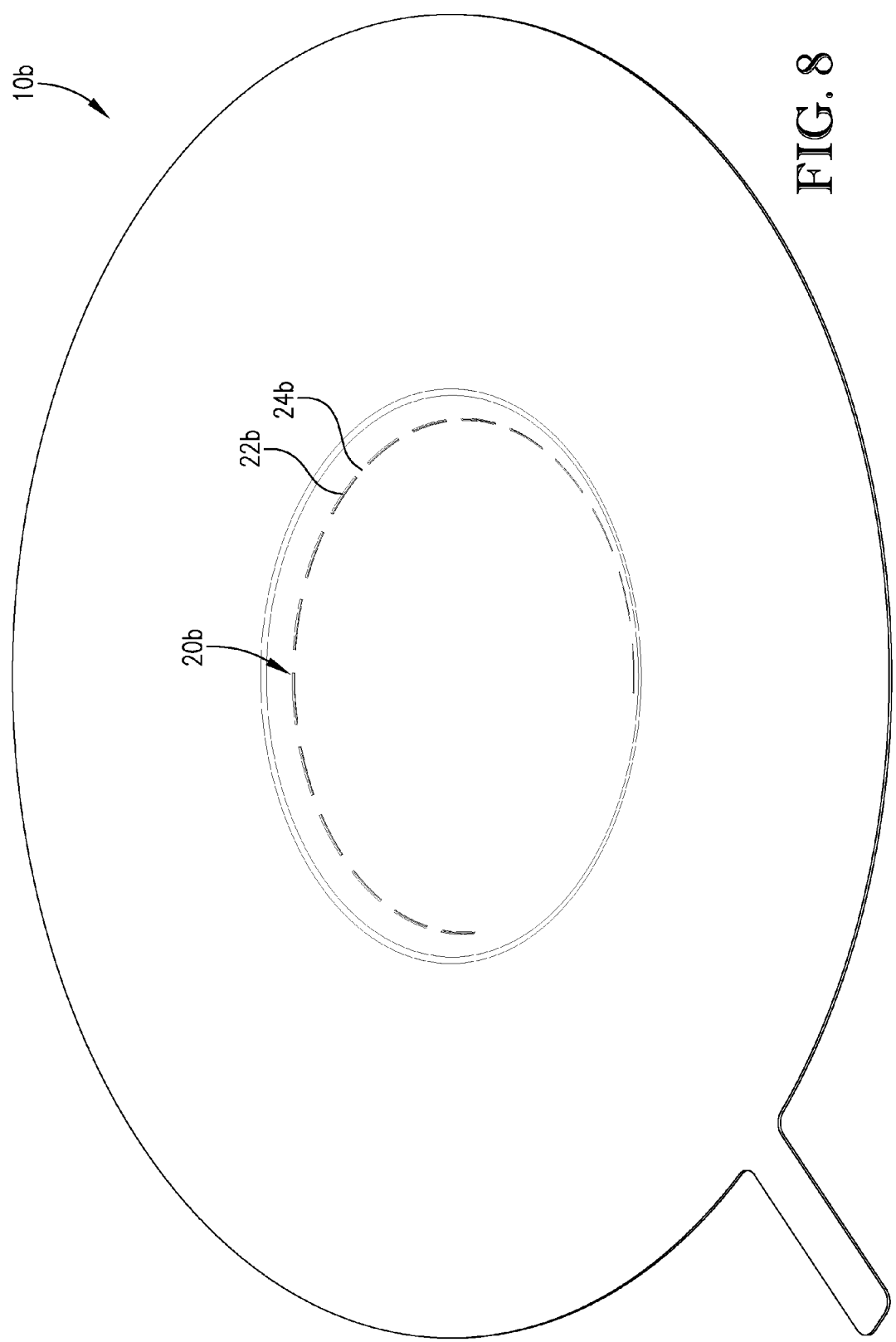
FIG. 8 is a perspective view of the concave face of another a rupture disc embodiment according to the present invention depicting a line of opening having relatively short gap segments between adjacent recesses.

FIG. 8 illustrates yet another embodiment of a rupture disc 10b where the length of recesses 22b are uniform throughout the length of line of opening 20b, but gap segments 24b are significantly shorter than recesses 22b. Thus, in certain embodiments, line of opening 20b would have a lesser resistance to tearing than line 20a upon opening of the respective disc.

Figure 9:
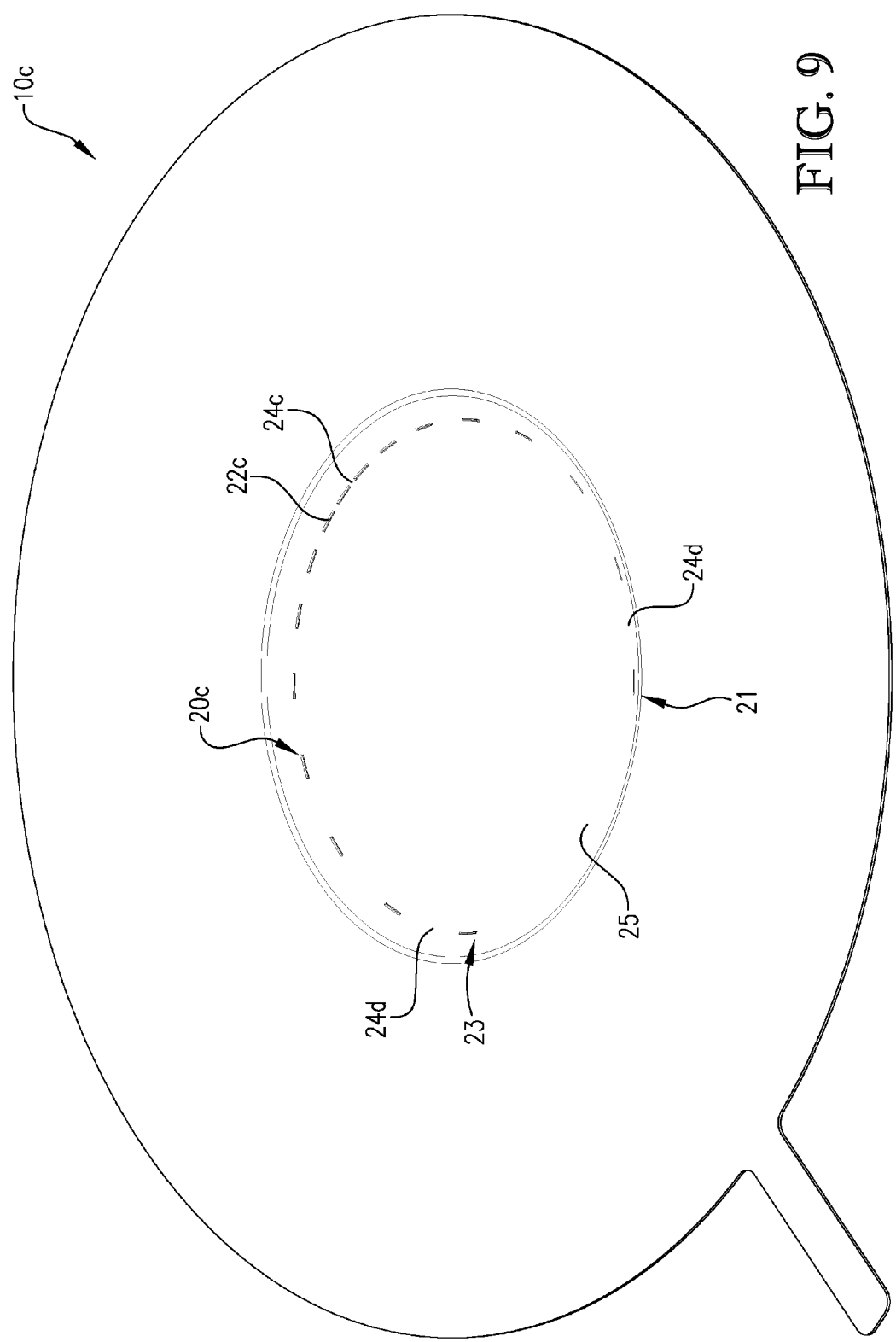
FIG. 9 is a perspective view of the concave face of another rupture disc embodiment according to the present invention depicting a line of opening comprising irregularly spaced recesses.

FIG. 9 illustrates an exemplary rupture disc 10c having a line of opening 20c comprising substantially uniform recesses 22c, but variable length gap segments. As shown, gap segments 24c, which are located opposite from hinge region 25, have a shorter length than gap segments 24d, which are located closer to end regions 21 and 23. Thus, in certain embodiments, line of opening 20c presents lower resistance to tearing in the area opposite hinge region 25, and increased resistance to tearing as hinge region 25 is approached. Such a configuration results in the absorption of energy as the overpressure relief area opens and reduces the likelihood of petal fragmentation.

In view of the foregoing illustrations, it can be appreciated that the characteristics of respective recesses 22 and gap segments 24 can be varied considerably in order to achieve desired disc opening performance.

Figure 10:
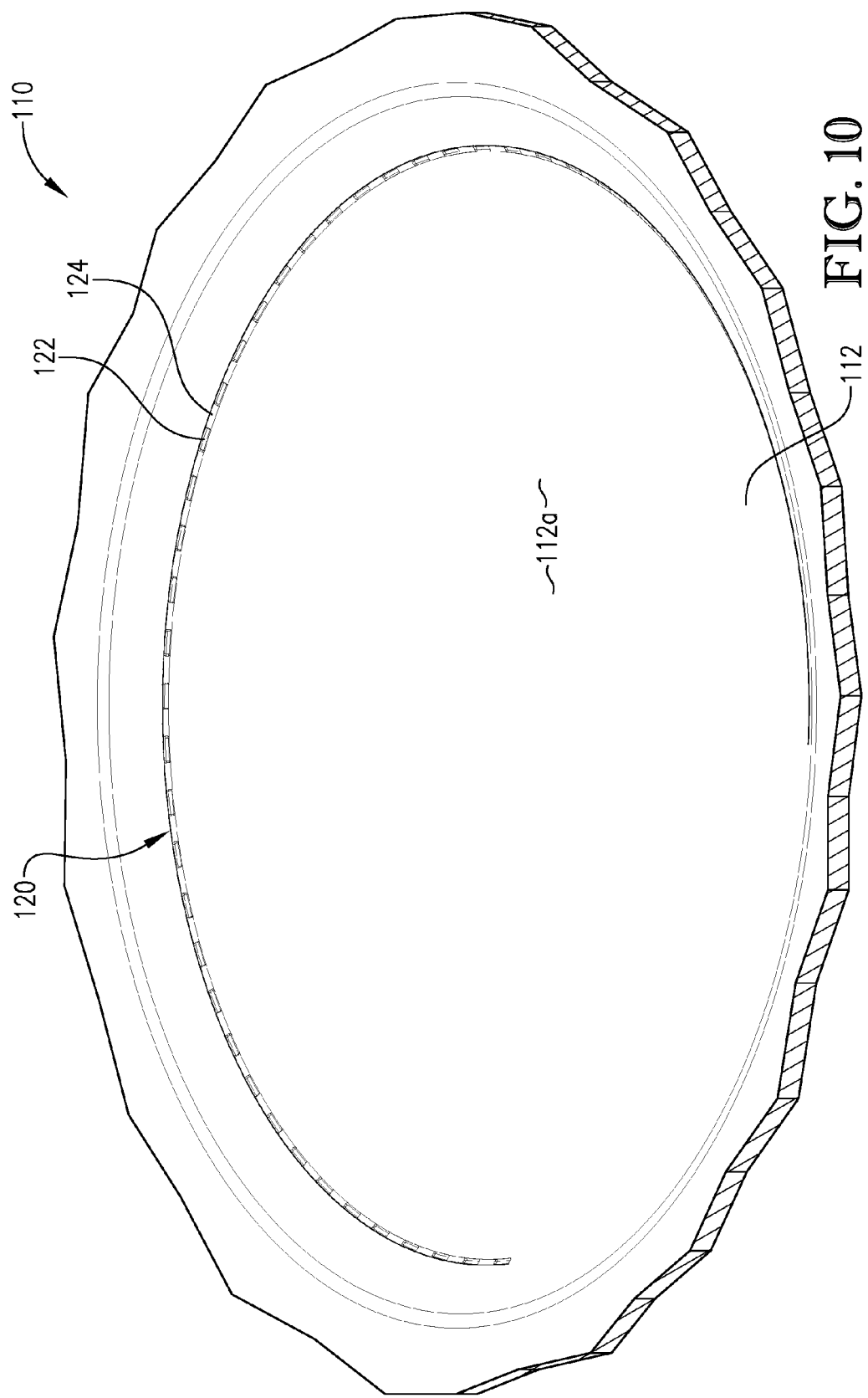
FIG. 10 is a fragmented view of the concave face of another rupture disc embodiment according to the present invention depicting an alternate line of opening comprising reduced-thickness gap segments.
Figure 11:
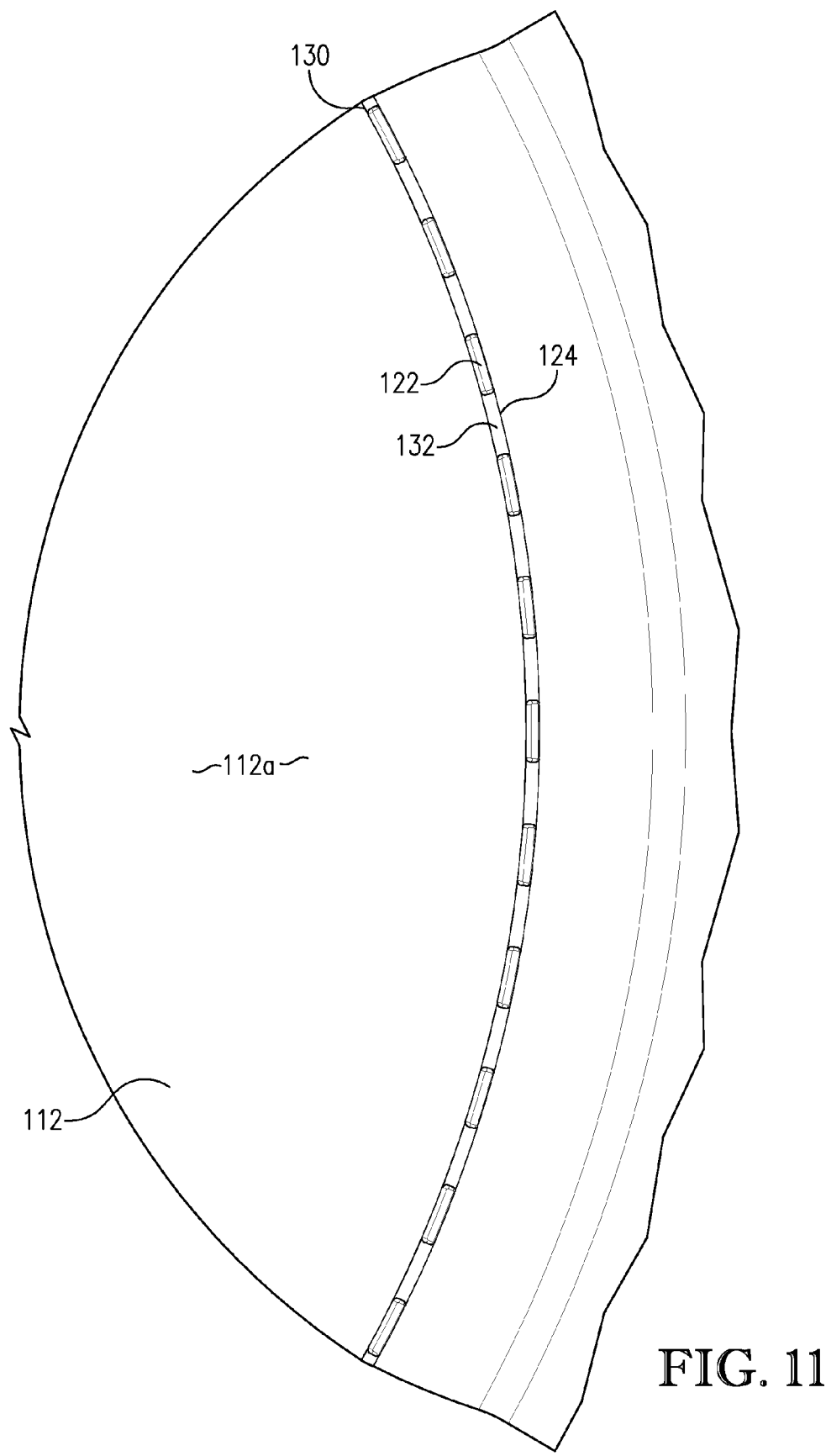
FIG. 11 is a close up fragmented view of the rupture disc of FIG. 10.
Figure 12:
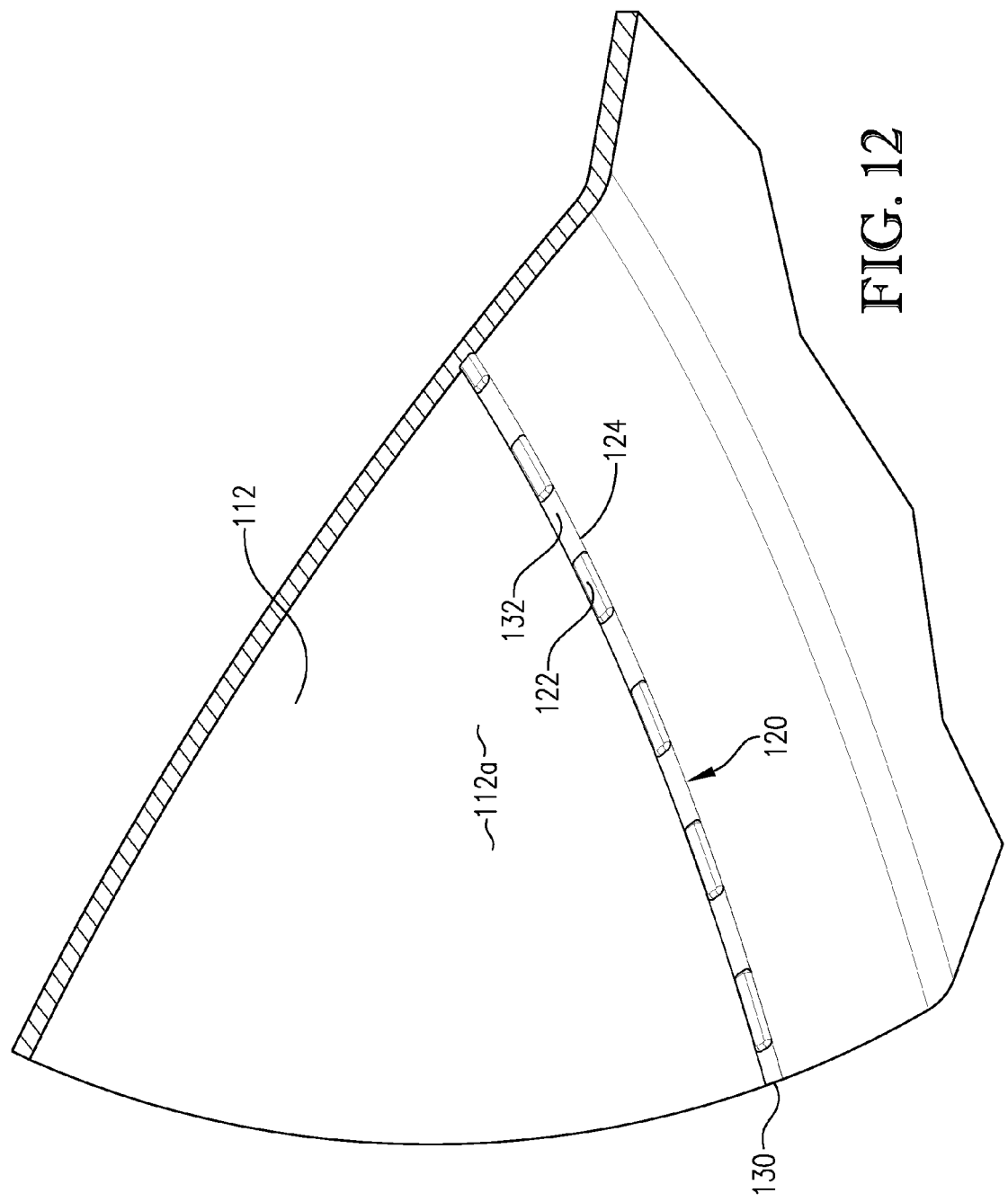
FIG. 12 is a sectioned view of the concave face of the rupture disc of FIG. 10.

FIGS. 10-15 illustrate additional embodiments for lines of opening made in accordance with the present invention. Turning first to FIGS. 10-12, a bulged rupture disc 110 is shown comprising a line of opening 120 formed in the concave face 112a of bulged section 112. Line of opening 120 comprises a plurality of alternating recesses 122 and gap segments 124. However, unlike the embodiments described previously, gap segments 124 do not lie flush with face 112a. Rather, these gap segments 124 are themselves recessed from face 112a, although they are of less depth than recesses 122. In manufacturing such structures, an initial channel 130 (see, FIG. 11) can be milled in face 112a of bulged section 112 (e.g., through laser machining) In certain embodiments, channel 130 can be of substantially uniform depth throughout the length thereof, although this need not necessarily be the case. Once the desired depth of channel 130, the laser can be passed over channel 130 and intermittently operated in order to selectively remove material from certain predetermined areas thereby resulting in the formation of recesses 122 and gap segments 124. Accordingly, gap segments 124 comprise a lased surface 132 that extends between adjacent recesses 122, although lased surface 132 is located at a shallower depth relative to recess 122.

Figure 13:
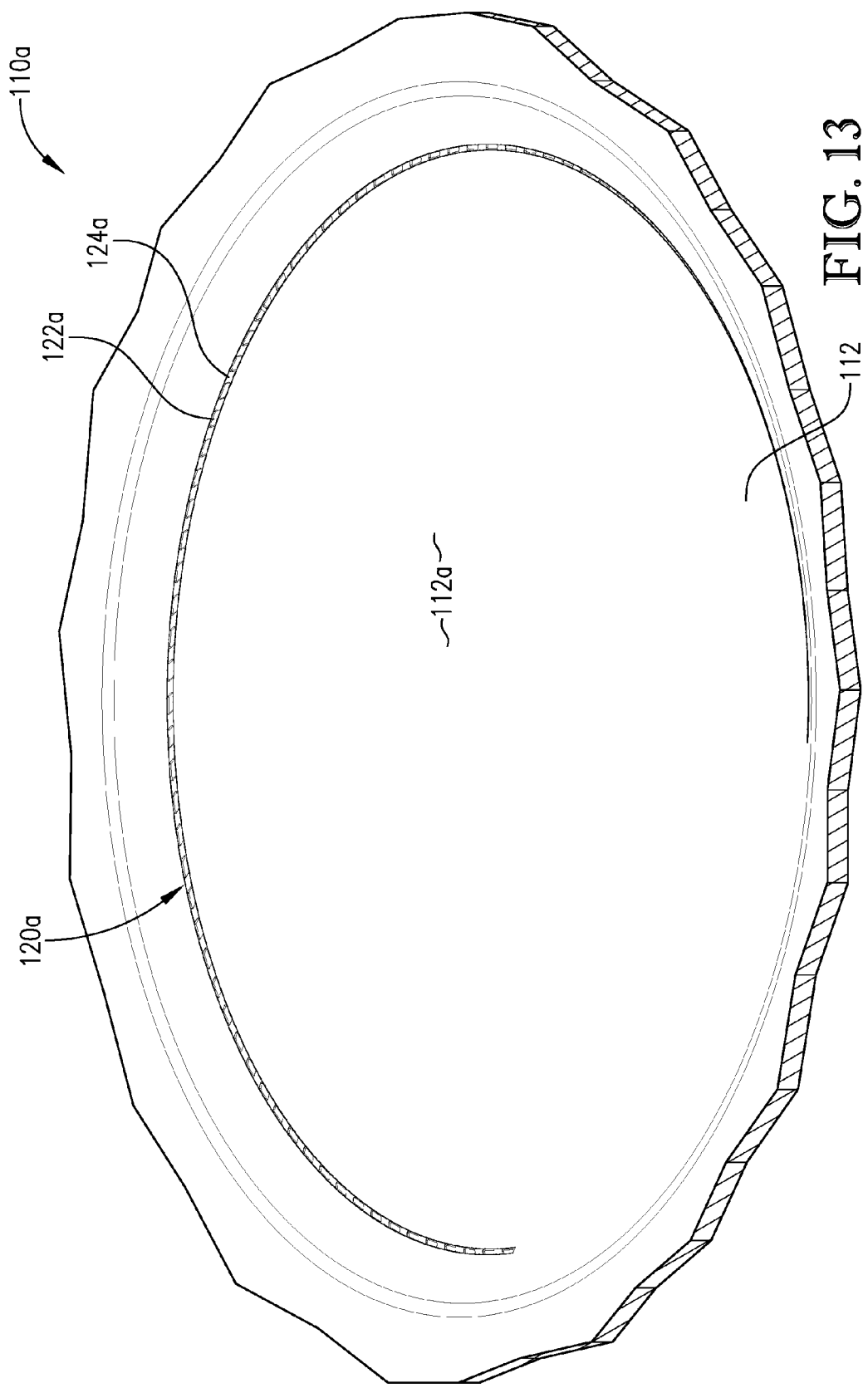
FIG. 13 is a fragmented perspective view of the concave face of another rupture disc embodiment according to the present invention depicting a line of opening comprising recesses of varying shapes.
Figure 14:
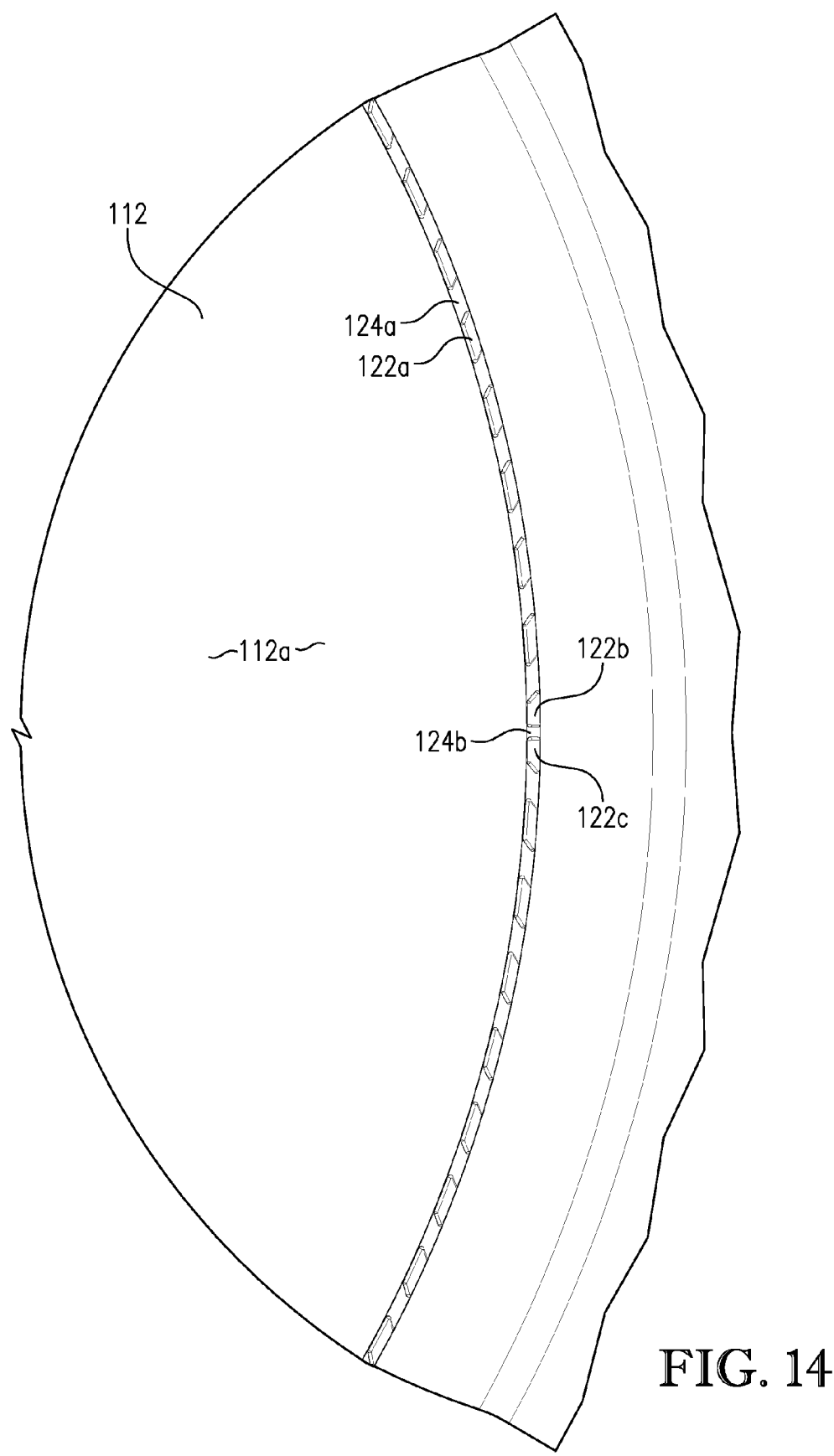
FIG. 14 is a close up fragmented view of the concave face of the rupture disc of FIG. 13.

Recesses 122 and gap segments 124 can be configured similarly to recesses 22 and gap segments 24 discussed previously in terms of length, width, depth, uniformity and variability along the length of line of opening 120. As illustrated in FIGS. 13-15, a rupture disc 110a is shown comprising a line of opening 120a formed in the concave face 112a thereof. Recesses 122a and gap segments 124a comprise an alternate geometric configuration. As illustrated in more detail in FIG. 14, recesses 122a are of substantially rhomboidal shape. Again, the margins of recesses 112a may not form an exact parallelogram given the overall curvilinear configuration of line of opening 120a. Other geometric shapes for recesses 122a and gap segments 124a are also contemplated by the present invention. For example, recesses 122a may be circular, ovular, rectangular, or trapezoidal. To illustrate the latter, recesses 122b and 122c have been machined in substantially trapezoidal shape, separated by a gap segment 124b having substantially parallel side margins.

Accordingly, it is apparent that lines of opening formed in accordance with the present invention can possess recesses and gap segments of many configurations. It is recognized that any of the elements or configurations discussed above can be combined together to achieve the desired opening characteristics for the line of opening. Thus, the scope of the present invention should in no way be seen as being limited by the embodiments discussed above.

We claim:

1. A pressure relief device comprising:
    an over-pressure relief area comprising a pair of opposing faces; and
    a circumscribing flange portion,
    said over-pressure relief area comprising a line of opening formed in at least one face thereof, said line of opening comprising a plurality of co-linear spaced-apart lased recesses formed thereon, said lased recesses extending from one of said faces through said over-pressure relief area without penetrating the opposing face,
    said line of opening defining, at least in part, a relief area petal that is formed upon opening of said relief area,
    said line opening further comprising a plurality of gap segments interspersed with said recesses, said gap segments having a depth that is less than the depth of said lased recesses.

2. The pressure relief device according to claim 1, wherein said recesses are substantially uniform in length.

3. The pressure relief device according to claim 1, wherein said lased recesses vary in length.

4. The pressure relief device according to claim 1, wherein said gap segments are flush with the face of said relief area in which said line of opening is formed.

5. The pressure relief device according to claim 1, wherein said gap segments comprise a lased surface.

6. The pressure relief device according to claim 1, wherein said gap segments are substantially uniform in length.

7. The pressure relief device according to claim 1, wherein said gap segments vary in length.

8. The pressure relief device according to claim 1, wherein at least one of said recesses extends from said face in which said line of opening is formed toward the other of said faces and has a depth that is between 50% to 90% of a thickness of said relief area immediately adjacent said at least one recess.

9. The pressure relief device according to claim 1, wherein said device comprises a metallic material.

10. The pressure relief device according to claim 9, wherein a metal grain structure of said relief area is substantially uniform along said line of opening recess and immediately adjacent thereto.

11. The pressure relief device according to claim 1, wherein said line of opening is substantially C-shaped and comprises spaced-apart opposed end regions that cooperatively define a hinge region of said relief area.

12. The pressure relief device according to claim 1, wherein said over-pressure relief area is bulged, and wherein one of said pair of faces is convex and the other of said pair of faces is concave.

13. The pressure relief device according to claim 12, wherein said lased recesses are formed in said concave face.

14. The pressure relief device according to claim 13, wherein said pressure relief device is a reverse-acting rupture disc.

15. The pressure relief device according to claim 14, wherein said over-pressure relief area comprises a reversal initiation feature.

16. The pressure relief device according to claim 15, wherein said reversal initiation feature comprises a discrete region of said over-pressure relief area having an altered metallic grain structure that exhibits greater residual stress than a metal of the remainder of the over-pressure relief area.

17. The pressure relief device according to claim 15, wherein said reversal initiation feature comprises a discrete region of said over-pressure relief area having a lased surface in which metal has been removed so as to reduce a thickness of said discrete region.

18. A method of forming a line of opening in a pressure relief device comprising:
    providing a pressure relief device comprising an over-pressure relief area having a pair of opposing faces and a circumscribing flange portion; and
    forming said line of opening in said over-pressure relief area by using a laser to selectively remove material from at least one of said faces and form a plurality of co-linear spaced-apart lased recesses, said line of opening defining, at least in part, a relief area petal that is formed upon opening of said relief area.

19. The method according to claim 18, wherein said line of opening further comprises a plurality of gap segments interspersed with said recesses.

20. The method according to claim 19, wherein said gap segments have a depth that is less the depth of said lased recesses.

21. The method according to claim 20, wherein said gap segments are flush with the face of said relief area in which said line of opening is formed.

22. The method according to claim 20, wherein said gap segments comprise a lased surface.

23. The method according to claim 18, wherein at least one of said recesses extends from said face in which said line of opening is formed toward the other of said faces and has a depth that is between 50% to 90% of a thickness of said relief area immediately adjacent said at least one recess.

24. The method according to claim 18, wherein said pressure relief device is a reverse-acting rupture disc.

25. The method according to claim 24, wherein said over-pressure relief area comprises a reversal initiation feature having a lased surface in which metal has been removed so as to reduce a thickness of said discrete region.

* * * * *